July 24, 1923.  A. R. GILMORE ET AL  1,463,117

TRAP

Filed March 24, 1922  2 Sheets-Sheet 1

A. R. Gilmore.
G. R. Carson.
INVENTORS

BY Victor J. Evans
ATTORNEY

WITNESS:

July 24, 1923.
A. R. GILMORE ET AL
TRAP
Filed March 24, 1922
1,463,117
2 Sheets-Sheet 2
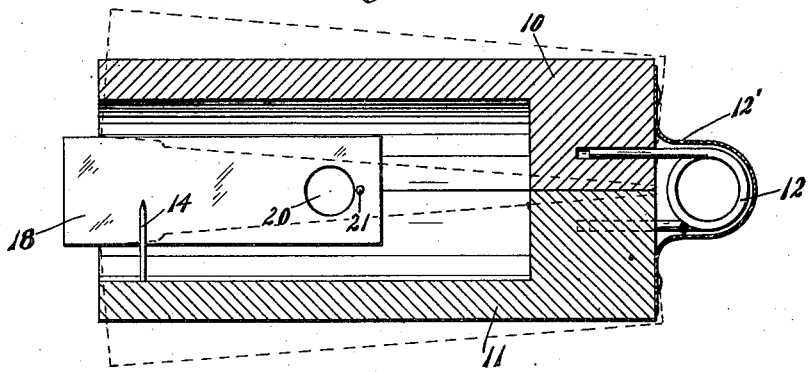
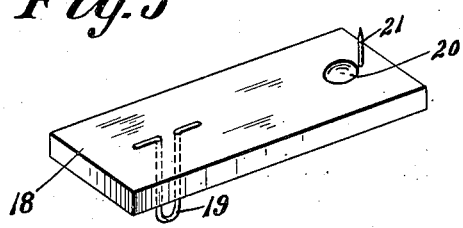
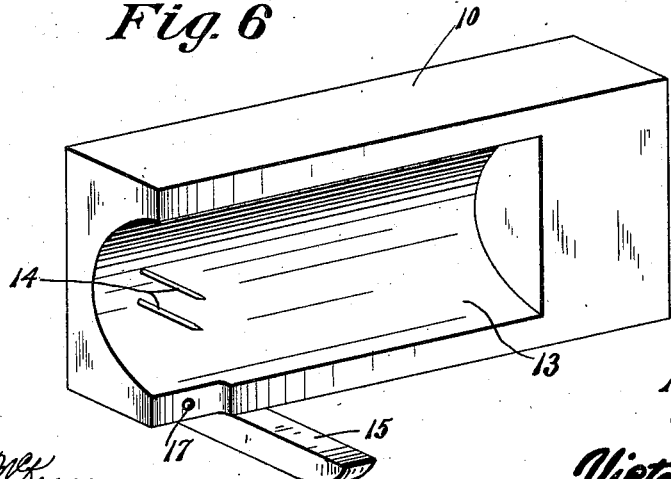
A. R. Gilmore.
G. R. Carson.
INVENTORS Patented July 24, 1923.

1,463,117

UNITED STATES PATENT OFFICE.

ALFRED R. GILMORE AND GATES R. CARSON, OF RED ROCK, PENNSYLVANIA.

TRAP.

Application filed March 24, 1922. Serial No. 546,376.

*To all whom it may concern:*

Be it known that we, ALFRED R. GILMORE and GATES R. CARSON, citizens of the United States, residing at Red Rock, in the county of McKean and State of Pennsylvania, have invented new and useful Improvements in Traps, of which the following is a specification.

This invention relates to rat traps, and has for its primary object, the provision of a trap made up of resiliently connected sections adapted to be held separated by a trip element, so that when the sections are released, they are forcibly moved toward each other into their active positions, the respective sections being provided with pronged elements adapted to pierce the body of the animal.

Another object of importance resides in the provision of a trap of the above mentioned character which is very effective for the purpose intended, and one which is very simple in construction, so that it can be manufactured, and sold at a nominal cost.

The nature and advantages of the invention will be better understood when the following detailed description is read in connection with the accompanying drawings, the invention residing in the construction, combination, and arrangement of parts as claimed.

In the drawings forming part of this application, like numerals of reference indicate similar parts in the several views, and wherein:—

Figure 4 is a sectional view taken on line 4—4 of Figure 2.

Figure 5 is a detail view of the combined bait holder and trip element.

Figure 6 is a detail view of one of the trap sections.

Figure 1:
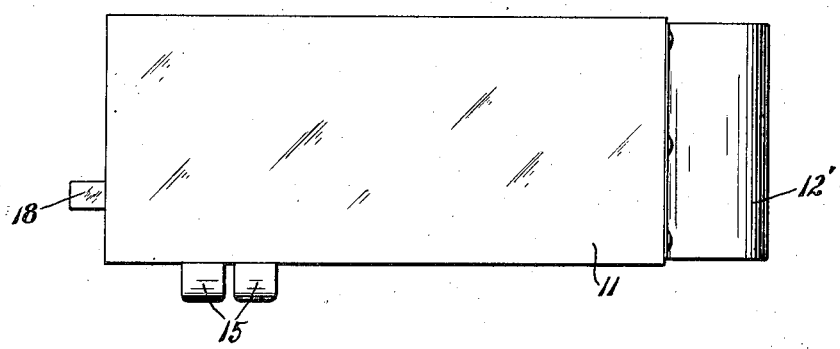
Figure 1 is a view in elevation of the trap.
Figure 2:
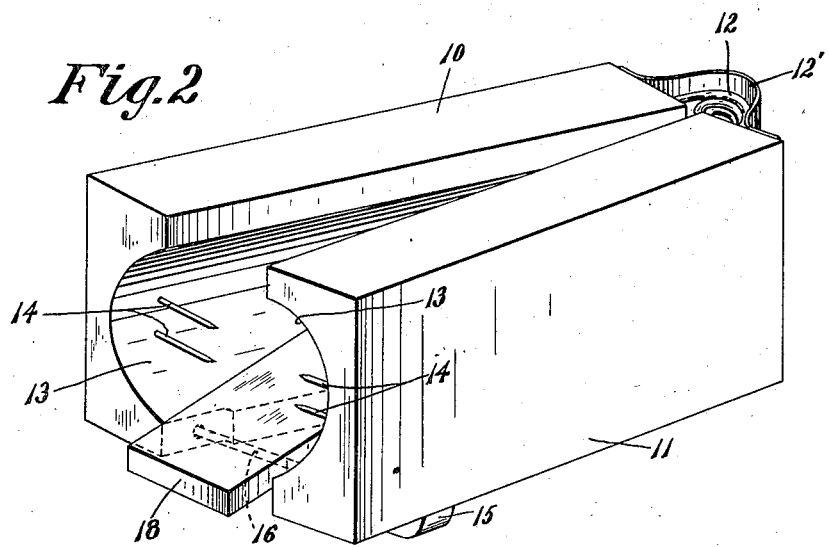
Figure 2 is a view, showing the trap in set position.
Figure 3:
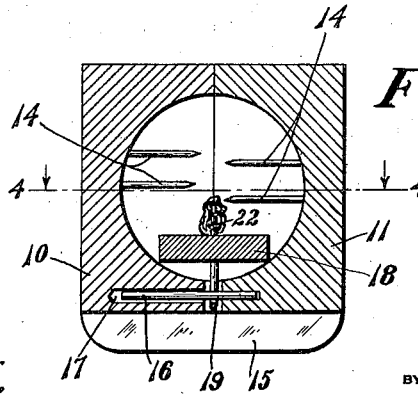
Figure 3 is a transverse sectional view through the trap, showing the latter closed.

Referring to the drawings in detail, the trap forming the subject matter of the invention embodies two identically constructed sections indicated at 10 and 11 respectively, the sections unitedly defining a trap of elongated design. These sections are arranged in confronting relation, and are connected together at one end for pivotal movement toward and away from each other, by means of a coiled spring 12, the latter defining a hinge. This hinge is housed by a casing 12' secured to the respective sections of the trap. The terminals of this hinge are embedded in the adjacent end walls of the respective sections of the trap. The inner side of each section is hollowed out for a portion of its length as at 13, so that when the trap is closed, it is provided with a longitudinal bore opening at one end and closed at the other end of the trap. Projecting from each section of the trap adjacent the open end of said bore are pointed prongs or the like 14 for the purpose to be hereinafter described. Secured to the adjacent sides of the respective sections are transversely disposed elements 15, these elements bridging the joint between the respective sections to minimize friction and to guide the sections in their movements toward and away from each other.

Projecting from the inner edge of the section 10 is a small wire rod 16 and this rod is received by an opening 17 in the corresponding edge of the section 11. A combined bait holder and tripping element is indicated at 18, the same consisting of an elongated strip of wood or the like which supports an eye 19, the latter being pivotally mounted upon the rod 16 above referred to. The eye is arranged adjacent one end of the said element, while the opposite end of the element is provided with a recess 20 and a pin 21 to receive and support the bait indicated at 22. Normally, this element is arranged within the bore of the trap substantially parallel with the sections thereof.

In practice, the sections 10 and 11 are separated an appreciable distance against the tension of the spring 12, and when separated a distance equal to the width of the trip element, the latter is arranged between the adjacent meeting edges of the sections to hold the said sections spaced. The trip element is moved upon its pivot and arranged at the proper inclination with respect to the trap, so that the bait can be properly presented to view, to entice the animal who will make an effort to secure the bait. When the trap element is slightly depressed, it is moved from between the meeting edges of the sections 10 and 11 of the trap, and the latter forcibly moved together under the influence of the spring 12. The animal is then trapped between the sections, the pointed spurs or the like piercing the body of the animal to prevent its escape. The tripping element can be so positioned between the meeting edges of the sections 10 and 11 to render the trap more or less sensitive. The construction is such that the trap can be easily and conveniently set without any danger of injuring the operator.

While it is believed that from the foregoing description, the nature and advantages of the invention will be readily apparent, we desire to have it understood that we do not limit ourselves to what is herein shown and described, and that such changes may be resorted to when desired as fall within the scope of what is claimed.

What we claim is:—

A trap of the character described comprising two identically constructed sections defining a trip body of elongated contour, and having a longitudinal bore open at one end and closed at the other end of the trap, yieldable means connecting the sections together at one end for pivotal movement toward and away from each other, pointed prongs projecting from each section within said bore, a rod projecting from the inner edge of one section, the corresponding edge of the other section having an opening receiving said rod, and a combined bait holder and trip element fulcrumed on said rod and disposed to be positioned between said edges of said sections to hold the latter spaced apart when the trap is set.

In testimony whereof we affix our signatures.

ALFRED R. GILMORE.
GATES R. CARSON.